Patented June 19, 1951

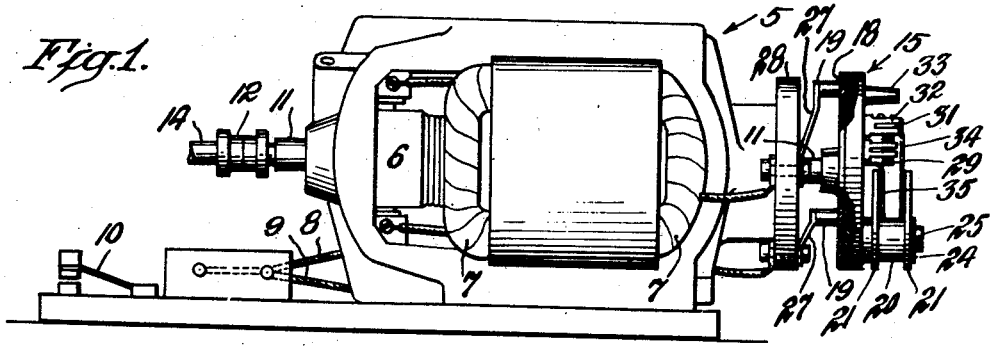

2,557,208

UNITED STATES PATENT OFFICE 2,557,208

ELECTRIC MOTOR SPEED REGULATION

Sigurd Ferdinand Thunberg, Ronninge, and Per Folke Alm and Ernst Fredrik Georg Fredlund, Stockholm, Sweden, assignors to Aktiebolaget Elektrolux, Stockholm, Sweden, a corporation of Sweden Application August 8, 1947, Serial No. 767,864
In Sweden September 12, 1944

Section 1, Public Law 690, August 8, 1946
Patent expires September 12, 1964

9 Claims. (Cl. 318—325)

1

This invention relates to electric motors, and more particularly to speed regulation of motors by a centrifugal switch which is driven by a motor and associated with the motor circuit.

Since voltage surges are impressed on the inductive circuit of an electric motor when the contacts of the centrifugal switch open and close to regulate the motor speed, a resistor is connected across the switch to limit the voltage surges and dissipate the surge energy. In recent years non-ohmic resistors have come into use because of their ability to limit voltage surges and also cause rapid decay of current for a given permissible peak voltage due to a voltage surge. Non-ohmic resistors are capable of reducing voltage surges to values which are in the neighborhood of three to four times normal voltage and which otherwise often reach values from nine to ten times normal voltage.

Non-ohmic resistors of the kind now available include those of the silicon carbide type, for example, and have a negative resistance-temperature coefficient, that is, the resistance at a given voltage or current falls with rising temperature. An important factor requiring consideration in using a non-ohmic resistor is its ability to dissipate heat, because insufficient heat dissipation may give rise to instability due to increase of current with rising temperature when the resistor is subjected at rapid intervals to voltage surges.

In regulating the speed of an electric motor, it is convenient to mount the centrifugal switch, and also the resistor connected across the contacts thereof, on the same rotatable member fixed to the motor shaft. Since the resistor is air-cooled, the requisite heat dissipating surface must be provided to reject the heat generated in the resistor to prevent such overloading that the resistor will become unstable. However, it is desirable to employ a resistor of the smallest size possible because in this way considerable saving in material costs can be effected, and this is especially true in the case of small size fractional horsepower motors which are usually produced in large production quantity. Further, the use of the smallest size resistor possible may become an important factor when fractional horsepower motors are mounted in office machine equipment and other devices having limited space in order to keep the overall size of the equipment at a minimum.

It is an object of the invention to provide an improvement for controlling the speed of an electric motor whereby a regulating resistor of minimum size is required.

It is another object to provide an improvement for controlling the speed of an electric motor whereby heat generated in a regulating resistor is effectively dissipated therefrom.

It is a further object to provide an improvement for dissipating heat from such a regulating resistor of the non-ohmic type by providing a relatively extensive heat transfer surface arranged to promote withdrawal of heat from the interior of the resistor.

It is a still further object to provide an improvement for dissipating heat from such a regulating resistor driven by an electric motor with which it is associated.

The above and other objects and advantages of the invention will be more fully understood upon reference to the following description and accompanying drawing forming a part of this specification, and of which Fig. 1 is a side elevation of apparatus embodying the invention; Fig. 2 is an end view of the apparatus shown in Fig. 1; Fig. 3 is an enlarged fragmentary elevation view, partly broken away and in section, of part of the construction shown in Figs. 1 and 2; Fig. 4 is a diagrammatic illustration of the embodiment shown in Figs. 1 to 3; and Fig. 5 is a view similar to Fig. 2, partly in section, illustrating a modification of the invention.

Referring to the drawing, the invention is shown in connection with a so-called fractional horsepower universal motor 5 having an armature 6 and field windings 7 connected in series therewith and to which current is supplied through leads 8 and 9 in one of which is connected a switch 10. The armature 6 is fixed to a shaft 11 which is connected by a suitable coupling 12 to a driven member 14 which may be associated with calculating machines and other office machine equipment, and cash registers and the like, for example, thereby necessitating speed control of the motor since it is under variable load.

Such speed control is effected by a centrifugally operated switch 15 having relatively movable contacts 16 and 17 connected in series with the armature 6 and field windings 7 with the aid of slip rings 18 and brushes 19 associated therewith. At normal speed the centrifugal force imparted to the switch 15 is ineffective to separate the contacts 16 and 17 whereby the motor remains energized. However, when the motor exceeds the normal speed at which the centrifugal force imparted to the switch 15 causes the contacts 16 and 17 to separate, the motor is deenergized and its speed falls until it again reaches the normal speed at which the contacts 16 and 17 are adjusted to engage.

In this way the normal speed is nicely regulated and the tendency for the motor to speed up and race at reduced load is avoided, the motor speed being confined in a narrow range which is of special importance when the motor is connected to drive office machine equipment and the like, for example. In order to limit voltage surges which are impressed on the inductive circuit of the motor 5 when the contacts 16 and 17 open and close to regulate the motor speed, provision is made for dissipating the surge energy by connecting across the contacts a resistor 20 which preferably is of a non-ohmic type because of its ability to limit voltage surges and also suppress sparking.

In accordance with this invention, in order that the resistor 20 may be of the smallest size and rating possible, and at the same time effectively and efficiently reject and give up heat generated therein to prevent overloading and avoid a condition giving rise to instability, a rotatable member 21 is provided which includes a plurality of elements 22 having a relatively extensive heat transfer surface with which the resistor 20 is in good thermal contact. The resistor 20 comprises a body of ceramic material having a negative resistance-voltage characteristic, and may be of any well known non-ohmic silicon carbide type which passes a current proportional to the fourth and fifth power of the voltage, for example.

The resistor 20 shown by way of example is of cylindrical shape having the opposing flat ends abutting and tightly held between the elements 22 at the outer surfaces of which are provided washers 23 and 24, the entire assembly having a passage formed by aligned openings in the parts which receives a cap screw 25 for removably mounting the assembly on a plate 26. The plate 26 is fixed to the shaft 11 in any suitable manner to be driven by the motor 5, and at the side thereof opposite the resistor 20 are provided the slip rings 18, the plate 26 being formed of suitable material for effectively insulating the slip rings 18 and resistor 20 from one another. The sationary brushes 19 are biased into contast with the slip rings 18 by resilient arms 27 fixed to an annular member 28 mounted on the motor 5.

The centrifugally operated switch 15 comprises the contact 16 fixed to a screw 29 which is adjustable on a stud 30 mounted on the plate 26 and connected to the inner slip ring 18, and the contact 17 fixed to a resilient leaf spring 31 which is carried by a stud 32 mounted on the plate and connected to the outer slip ring. At normal speed of the motor 5, the leaf spring 31 is effective to maintain the contacts 16 and 17 closed, while the centrifugal force imparted to the leaf spring when the motor exceeds its normal speed causes the spring to move toward a stop 33 and open the contacts, thereby putting in the motor circuit the resistor 20 which is connected across the contacts by the leads 34 and 35. By shifting the position of the screw 29 on the stud 30, the motor speed at which the relatively movable contacts 16 and 17 open can be nicely adjusted.

It will now be understood that a compact centrifugal switch and resistor assembly is provided which is an important factor when a fractional horsepower motor like the motor 5 is employed in connection with devices in which limited space is available to house the motor whose speed must be regulated and confined within a narrow range. Further, the resistor 20 is mounted on the plate 26 in the manner shown and just described so that it will serve as a counterweight in the centrifugal switch 15, thus providing a balanced assembly which contributes to maintaining the desired speed regulation of the motor 5.

The heat transfer elements 22 between which the resistor 20 is disposed are semi-circular in shape and formed with notches or recesses 36 at regions closely adjacent to the axis about which the plate 26 rotates. The spaced apart elements 22, together with the resistor 20, essentially form a fan in which the notches 36 serve as an inlet through which air is drawn into the gap between the elements when being driven by the motor 5. The air drawn through the notches 37 into the gap is forced radially outward to the periphery of the heat transfer elements in a definite path of flow therebetween. In this way rotation of the elements induces positive movement of air which sweeps over and in intimate contact with the surfaces of the elements and the resistor 20, thereby effectively dissipating heat generated in the resistor.

By employing the elements 22 which desirably are formed of light metal and in good thermal conductive relation with the resistor, a relatively extensive heat transfer surface is provided to which heat can readily flow from a higher temperature level from the interior of the resistor body not only to a lower temperature level at the peripheral surface thereof, but also to a much lower temperature level at the elements due to the positive and continuous movement of air over the surfaces thereof. Thus, heat is effectively rejected by the elements and given up to the air which circulates in the gap between the elements by fan action.

Since non-ohmic resistors are formed of ceramic material like silicon carbide having a crystalline-like grain structure, it has been found that the rate at which heat is dissipated from such resistors can be further increased by providing a layer of soft material having good heat conducting properties, such as lead, for example, at the contact regions between the ends of the resistor and the heat transfer elements, as indicated at 37 in Fig. 3. This is so because soft material like lead increases the actual contact surface between the elements 22 and rough and porous surfaces of the resistor body as much as tenfold. In such case it has been possible to load resistors having a rating of 1.5 watts to values as high as 25 watts without encountering any condition giving rise to instability, the resistors functioning in the desired manner to limit voltage surges and dissipate surge energy. It will therefore be evident that considerable saving in costs can be effected in accord with the invention which makes it possible to use resistors of minimum size.

Fig. 5 illustrates a modification which is generally like the embodiment just described and differs therefrom in that vanes 38 are also provided between the heat transfer elements 22 to increase the heat transfer surface area and increase the rate at which air is positively swept over elements and the resistor 20.

While particular embodiments of the invention have been shown and described, such variations and modifications are contemplated as fall within the true spirit and scope of the invention, as pointed out in the following claims.

What is claimed is:

1. In a centrifugally operated switch for maintaining the speed of a controlled electrical device substantially constant, the combination of a rotatable shaft adapted to be operatively associated with the electrical device, a centrifugally operated circuit operating means driven by said shaft comprising a pair of relatively movable contacts, a resistor having a negative resistance-voltage characteristic which is connected across said contacts, a rotatable member driven by said shaft including means providing a relatively extensive heat transfer surface, said relative extensive heat transfer surface being disposed transverse to the axis of said rotatable member and possessing good thermal conductive properties, and means providing a good heat conductive connection between said resistor and said means providing the heat transfer surface for effectively dissipating heat from all parts of said resistor including the interior thereof during rotation of said member to control the speed of the controlled electrical device within narrow limits irrespective of the length of time said resistor has been functioning as a part of the circuit operating means, said last-mentioned means including material for increasing the actual contact surface effected between said resistor and heat transfer surface.

2. In a centrifugal switch, the combination of a rotatable shaft, a centrifugally operated circuit operating means driven by said shaft comprising a pair of relatively movable contacts, a resistor connected across said contacts, and a rotatable member driven by said shaft including a pair of spaced apart elements which are arranged transverse to the axis of rotation of said member and provide a relatively extensive heat transfer surface, said elements being of semi-circular shape and formed with notches at regions at or closely adjacent to the axis about which said member rotates, said resistor being disposed in the gap between said elements and comprising a body of material whose temperature tends to rise due to heat generated therein when said contacts open and close, and means for connecting the opposing end surfaces of said resistor body in good thermal conductive relation with said elements for effectively dissipating heat from all parts of said body during rotation of said member.

3. In a centrifugal switch, the combination of a rotatable shaft, circuit operating means driven by said shaft, said circuit operating means being influenced by centrifugal force and having a pair of relatively movable contacts, a resistor connected across said contacts which comprises a body of matter having a negative resistance-temperature coefficient, a rotatable member driven by said shaft including plate means constructed and arranged to induce flow of air over a surface thereof by fan action, and means for connecting said resistor in good thermal conductive relation with said plate means for effectively dissipating heat from all parts of said resistor during rotation of said member, said connecting means comprising a layer of relatively soft material possessing good heat conducting property interposed between said plate means and the surface of said body in good thermal conductive relation therewith.

4. In a centrifugal switch, the combination of a rotatable shaft, circuit operating means driven by said shaft, said circuit operating means being influenced by centrifugal force and having a pair of relatively movable contacts, a resistor connected across said contacts which comprises a body of material having opposing flat surfaces, a rotatable member driven by said shaft comprising plate means including a pair of spaced apart metal sheets constructed and arranged to induce flow of air over surfaces thereof by fan action, and means for connecting the opposing flat surfaces of said resistor body in good thermal conductive relation with said sheets for effectively dissipating heat from all parts of said resistor during rotation of said member.

5. The combination set forth in claim 4 in which said sheets are of semi-circular shape having notches or cut away portions at regions nearer to the axis about which said member rotates than to the outer peripheral edges of said sheets.

6. The combination set forth in claim 5 including vanes bridging the gap between said sheets to promote movement of air by fan action.

7. In a centrifugally operated switch for maintaining the speed of a controlled electrical device substantially constant, the combination of a rotatable shaft adapted to be operatively associated with the electrical device, a centrifugally operated circuit operating means driven by said shaft comprising a pair of relatively movable contacts, a resistor having a negative resistance-voltage characteristic which is connected across said contacts and comprises a body of material having a crystalline-like grain structure, a rotatable member driven by said shaft including means providing a relatively extensive heat transfer surface, and means for connecting said resistor body in good thermal conductive relation with said means providing the heat transfer surface for effectively dissipating heat from all parts of said resistor body during rotation of said member to control the speed of the controlled electrical device within narrow limits irrespective of the length of time said resistor body has been functioning as a part of the circuit operating means, said last-mentioned connecting means including matter interposed between said resistor body and said means providing the heat transfer surface which is in intimate contact therewith and possesses good thermal conductive properties and is relatively soft.

8. In a centrifugally operated switch for maintaining the speed of a controlled electrical device substantially constant, the combination of a rotatable shaft adapted to be operatively associated with the electrical device, a centrifugally operated circuit operating means driven by said shaft comprising a pair of relatively movable contacts, a resistor having a negative resistance-voltage characteristic which is connected across said contacts and comprises a body of material having a crystalline grain structure, a rotatable member driven by said shaft including means providing a relatively extensive heat transfer surface, and means for connecting said resistor body in good thermal conductive relation with said means providing the heat transfer surface for effectively dissipating heat from all parts of said resistor body during rotation of said member to control the speed of the controlled electrical device within narrow limits irrespective of the length of time said resistor body has been functioning as a part of the circuit operating means, said last-mentioned connecting means including lead interposed between said resistor body and said means providing the heat transfer surface which is in intimate contact therewith.

9. In a centrifugal switch, the combination of a rotatable shaft, circuit operating means driven by said shaft, said circuit operating means being influenced by centrifugal force and having a pair of relatively movable contacts, a resistor connected across said contacts, said resistor having an uneven surface, a rotatable member driven by said shaft comprising a sheet providing a heat transfer surface arranged transverse to the axis of rotation of such member, and means providing a heat conductive connection between the uneven surface of said resistor and said sheet including material which is in intimate contact with substantially all regions of the abutting portions of said resistor and said sheet.

SIGURD FERDINAND THUNBERG.
PER FOLKE ALM.
ERNST FREDRIK GEORG FREDLUND.

REFERENCES CITED

The following references are of record in the file of this patent:

UNITED STATES PATENTS

| Number | Name | Date |
|---|---|---|
| 1,343,954 | Akimoff | June 22, 1920 |
| 1,732,367 | Kleinschmidt | Oct. 22, 1929 |
| 1,802,731 | Moser | Apr. 28, 1931 |
| 2,081,894 | Meyer et al. | May 25, 1937 |
| 2,295,305 | Summers | Sept. 8, 1942 |